United States Patent
Lim et al.

(10) Patent No.: US 8,885,647 B2
(45) Date of Patent: Nov. 11, 2014

(54) METHOD AND SYSTEM FOR DOMAIN BASED PACKET FORWARDING

(75) Inventors: Chang Gyu Lim, Daejeon (KR); Tae Yeon Kim, Daejeon (KR); Seung Hyun Yoon, Daejeon (KR); Ho Young Song, Daejeon (KR); Jong Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 62 days.

(21) Appl. No.: 13/586,915

(22) Filed: Aug. 16, 2012

(65) Prior Publication Data
US 2013/0156035 A1 Jun. 20, 2013

(30) Foreign Application Priority Data
Dec. 19, 2011 (KR) .................... 10-2011-0137661

(51) Int. Cl.
*H04L 12/26* (2006.01)
(52) U.S. Cl.
USPC ............................ 370/392; 370/471; 370/475
(58) Field of Classification Search
None
See application file for complete search history.

(56) References Cited

U.S. PATENT DOCUMENTS

| | | | | |
|---|---|---|---|---|
| 2003/0043427 | A1* | 3/2003 | Robidas et al. ............... | 359/110 |
| 2004/0240447 | A1* | 12/2004 | Dorbolo et al. ............... | 370/392 |
| 2007/0177627 | A1* | 8/2007 | Raju et al. ..................... | 370/469 |
| 2008/0056494 | A1* | 3/2008 | Jacobson et al. .............. | 380/255 |
| 2009/0204715 | A1* | 8/2009 | Prakasha ....................... | 709/228 |
| 2011/0286456 | A1* | 11/2011 | Kompella ..................... | 370/390 |
| 2013/0297801 | A1* | 11/2013 | Guest et al. ................... | 709/226 |

OTHER PUBLICATIONS

Naous, Jad et al., "Defining and enforcing transit policies in a future Internet," Technical Report TR-10-07, Department of Computer Science, The University of Texas at Austin, 15 pages (2010).
Zhang, Xin et al., "SCION: Scalability, Control, and Isolation on Next-Generation Networks," TRUST Autumn 2011 Conference, 16 pages (2011).

\* cited by examiner

*Primary Examiner* — Chi Pham
*Assistant Examiner* — Soon-Dong D Hyun
(74) *Attorney, Agent, or Firm* — Nelson Mullins Riley & Scarborough LLP; Anthony A. Laurentano, Esq.; Lewis Lee, Esq.

(57) ABSTRACT

Disclosed are an apparatus and a method for swapping headers for authenticating policy based domains and tracing paths at the time of high-reliable data plane transmission. The method includes receiving packets forwarded through predetermined paths, confirming whether the received packets are normal packets, determining whether the path identification information corresponding to the paths of the received packets is present in a header information storage unit of a domain receiving the packets, swapping the headers included in the packets to swapping headers of the header information storage unit by using the identification information if it is determined that the path identification information is present, and correcting the path tracing information. By this configuration, degradation in data plane performance due to the lengths of headers can be solved.

17 Claims, 6 Drawing Sheets

METHOD AND SYSTEM FOR DOMAIN BASED PACKET FORWARDING

CROSS-REFERENCE TO RELATED APPLICATIONS

This application claims priority to and the benefit of Korean Patent Application No. 10-2011-0137661 filed in the Korean Intellectual Property Office on Dec. 19, 2011, the entire contents of which are incorporated herein by reference.

TECHNICAL FIELD

The present invention relates to an apparatus and a method for swapping headers for authenticating policy based domains and tracing paths at the time of high-reliable data plane transmission, and more particularly, to an apparatus and a method for confirming and swapping header portions confirming whether received packets are authenticated to go through the corresponding domains and header portions confirming whether the received packets go through all the paths that are to go through until being reached to the corresponding domains, at the time of high-reliable data plane transmission among different domains.

BACKGROUND ART

An apparatus and a method for authenticating policy based domains and tracing paths at the time of high-reliable data plane transmission according to the related art request paths from a sender to a destination to a path server and authenticate each domain participating in the paths. The authenticated contents are embedded into packet headers to be transmitted and are encrypted and transmitted. Received domains confirm whether headers are authenticated to go through the corresponding domains and whether headers go through all the paths that are to be go through until being reached to the corresponding domains and then, correct and transmit the headers. Since the method according to the related art embeds headers having a predetermined length corresponding to the number of domains that is to go through from the senders, when the number of domains to go through is increased, the lengths of the headers are variably long, such that time to be processed on the data plane may be increased and overhead occupied by all the packets may also be increased.

SUMMARY OF THE INVENTION

The present invention has been made in an effort to solve degradation in data plane performance due to header lengths by limiting the number of domains to go through from senders and swapping headers for domains of the remaining paths from specific intermediate domains.

An exemplary embodiment of the present invention provides a method for domain based packet forwarding, including: determining whether identification information corresponding to packet path identification information for identifying paths to which packets to be forwarded are forwarded is in a header information storage unit storing identification information on packet paths; swapping headers including the forwarding path information of the packets defining the forwarding paths of the packets by using the identification information, if it is determined that the identification information is present; and correcting path tracing information related to a forwarding path history of the packets.

The method may further include: prior to the determining whether the identification information is present; receiving the packets forwarded through a predetermined path; and confirming whether the received packets are normal packets, wherein the determining whether the identification information is present is performed when the received packets are normal packets.

The method may further include: prior to the receiving of the packets, receiving a path information request signal for transmitting packets from a sender and splitting the packets according to the number of predetermined domains; receiving, by preceding domains that are at the head on each of the split partial paths, path consent from succeeding domains on the partial paths; and forwarding, by the sender, packets in which the headers including the consent and payloads are combined to the succeeding domains on the paths.

The confirming whether the received packets are normal packets may include: determining whether the headers of the received packets have consent issued from the domains receiving the packets; and determining whether the received packets are forwarded through the predetermined paths by using the path tracing information of the received packets.

The method may further include: if it is determined that the received packets are abnormal packets in the confirming whether the received packets are the normal packets, dropping the received packets.

The method may further include: forwarding packets to succeeding domains succeeding to domains receiving packets in which the path tracing information is corrected on the predetermined paths.

The headers generated by the sender may further include the path identification information defining the predetermined paths and the path tracing information for tracing the forwarding paths.

The header information storage unit may include the swapping headers into which the headers of the received packets are swapped and the path identification information.

The swapping headers may include the path consent, the path identification information defining the predetermined path, and the path tracing information related to a forwarding path history of the packets.

The method for domain based packet forwarding may be repeatedly performed until the packets are forwarded to the destination of the predetermined paths.

Another exemplary embodiment of the present invention provides a system for domain based packet forwarding through domains, including: a path server configured to receive a path information request signal for transmitting packets from a sender and split the paths according to the number of predetermined domains; and a forwarding processing unit configured to process forwarding of packets using the split paths.

The forwarding processing unit may include: a normal packet confirming unit configured to receive the packets forwarded through a predetermined path and confirm whether the received packets are normal packets; a header information storage unit configured to store or manage header information for forwarding the received packets; a path identification information searching unit configured to determine whether path identification information corresponding to paths of the received packets is present in the header information storage unit if it is determined that the received packets are normal packets; a swapping processing unit configured to swap the headers of the packets to swapping headers of the header information storage unit, if it is determined that the path identification information is present in the header information storage unit; and a path tracing information correcting unit configured to correct the path tracing information included in the headers of the packets.

The system may further include: an authentication server configured to receive a request for the packet forwarding through the domains and issue consent approving the receiving.

The normal packet confirming unit may include: an approval confirming unit configured to confirm whether the headers of the received packets have the consent issued from the domains receiving the packets; and a path confirming unit configured to determine whether the received packets are forwarded through the predetermined paths by using the path tracing information of the received packets.

The domains may drop the received packets when the received packets are abnormal packets in the normal packet confirming unit.

The forwarding processing unit of the domains may further include a forwarding unit configured to forward the packets in which the path tracing information is corrected to succeeding domains on the predetermined paths.

The header information storage unit may include the swapping headers into which the headers of the received packets are swapped and the path identification information defining the predetermined paths.

The swapping header may include the path consent, the path identification information, and the path tracing information for tracing the paths.

According to another exemplary embodiment of the present invention, in a computer readable recording medium in which the method for domain based packet forwarding can be executed on a computer, the method includes: receiving packets forwarded through predetermined paths, and confirming whether the received packets are normal packets; determining whether the path identification information corresponding to the paths of the received packets is present in a header information storage unit of a domain receiving the packets; swapping the headers included in the packets to swapping headers of the header information storage unit by using the identification information if it is determined that the path identification information is present; correcting the path tracing information included in the headers of the packets; and forwarding the packets in which the path tracing information is corrected to succeeding domains succeeding to a first domain on the predetermined path.

The method and system for domain based packet forwarding according to the present invention can solve the degradation in data plane performance due to the header lengths by limiting the number of domains to go through from the senders and swapping headers for domains of the remaining paths from the specific intermediate domains.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
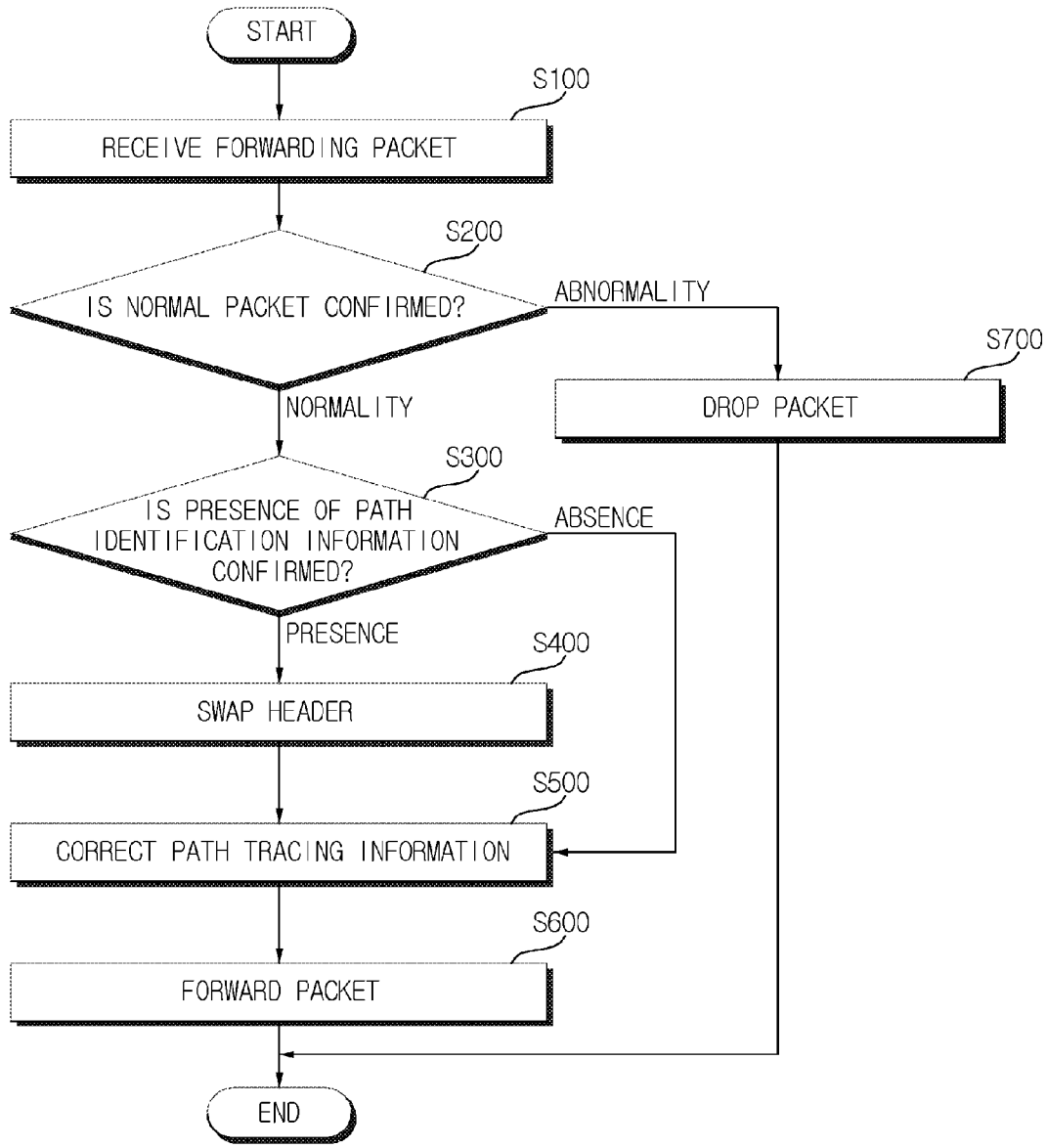
FIG. 1 is a flow chart showing a method for domain based packet forwarding according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described with reference to the accompanying drawings. Like reference numerals designate like components having substantially the same constitution and function in the drawings of the present invention and a description thereof will be omitted. When it is determined that the detailed description of the known art related to the present invention may obscure the gist of the present invention, the detailed description thereof will be omitted.

FIG. 1 is a flow chart showing a method for domain based packet forwarding according to an exemplary embodiment of the present invention.

Referring to FIG. 1, a method for domain based packet forwarding according to an exemplary embodiment of the present invention includes: receiving, by a domain, forwarding packets (S100); confirming, by a normal packet confirming unit 221, whether received packets are normal packets (S200); if it is identified whether the received packets are normal packets, confirming, by an identification information searching unit 222, whether path identification information is present in received domains (S300); if it is identified whether the received packets are abnormal packets, dropping, by the normal packet confirmation unit 221, the received packets (S700); if it is determined that the path identification information is present in the received domain, swapping, by a header swapping processing unit 224, headers of the received packets (S400), correcting, by a path tracing information correcting unit 225, path tracing information of the received packets (S500), and forwarding, by a forwarding unit 226, the packets in which the path tracing information is corrected to next domains (S600).

The receiving of the packets by the domains (S100) is a step of processing the forwarded packets and then, forwarding the packets to next domains or finally receiving the packets when the received domains are a destination. The packet forwarding method according to the exemplary embodiment of the present invention includes requesting and splitting paths by receiving a transmission request for a sender before forwarding the packets to approve the paths and splitting the approved paths. The requesting and splitting of the paths will be described in detail with reference to FIG. 2.

Figure 2:
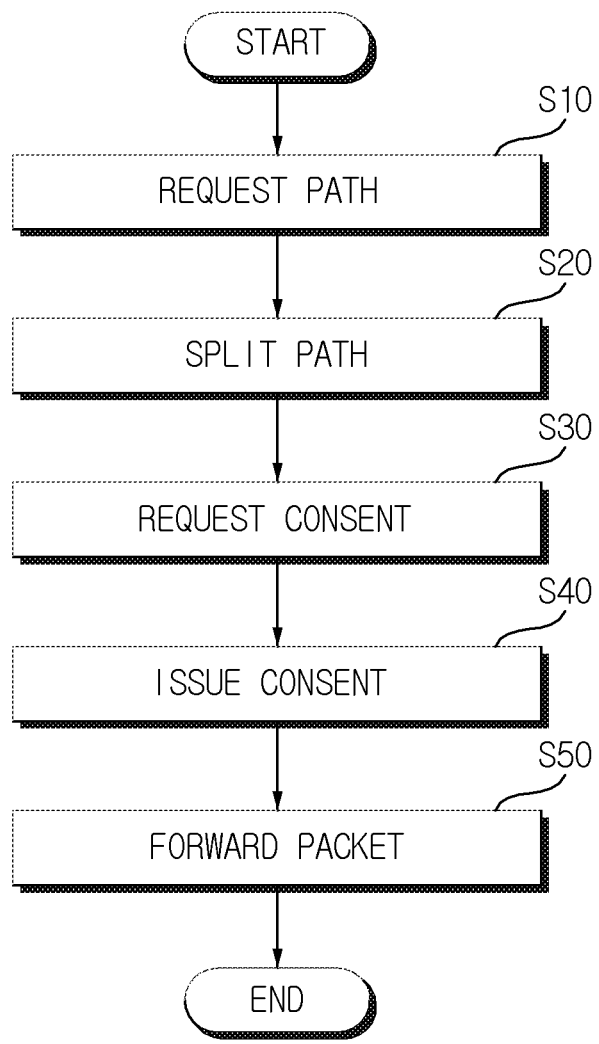
FIG. 2 is a flow chart showing a method for splitting paths for domain based packet forwarding according to an exemplary embodiment of the present invention.

FIG. 2 is a flow chart showing a method for splitting paths for domain based packet forwarding according to an exemplary embodiment of the present invention. Referring to FIG. 2, the splitting of the paths according to the exemplary embodiment of the present invention includes: requesting, by the domains wanting to transmit the packets, path information for transmitting the packets (S10); splitting, by a path server 100, domains passing through the paths according to the number of predetermined domains (S20); requesting, by the domains, forwarding consent to the domains passing through the paths (S30); issuing, by an authentication server 210, the consent by receiving the request for the consent (S40); and forwarding, by a forwarding processing unit 220, packets including the issued consent (S50).

The requesting of the path information for transmitting the packets by the domains wanting to transmit the packets (S10) is a step of requesting the path information for transmitting the packets to the path server 100 from the sender side intending to transmit the packets.

The splitting of the domains passing through the paths by the path server 100 according to the number of predetermined domains (S20) is a step of splitting, by the path server 100, the domains existing between the sender transmitting the packets and a destination that is a final destination of the packets according to the number of predetermined domains.

Figure 4:
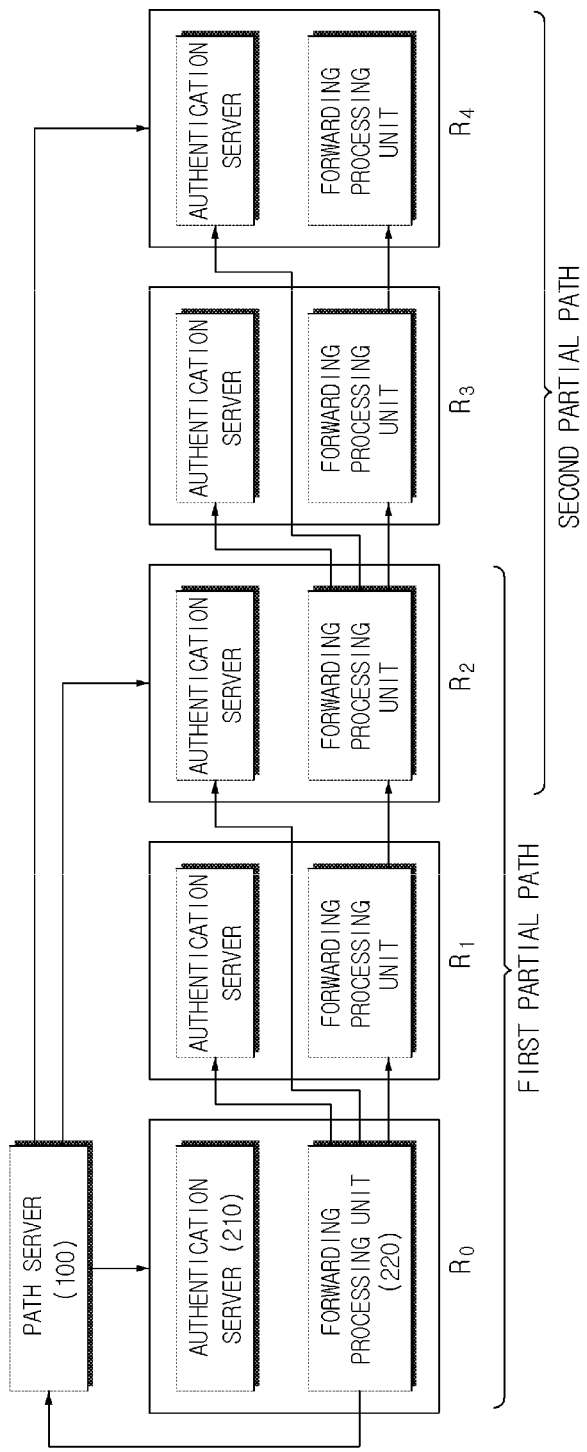
FIG. 4 is an exemplified diagram showing a system for domain based packet forwarding according to an exemplary embodiment of the present invention.

Specifically referring to FIG. 4, in the exemplary embodiment of the present invention, when five domains R0, R1, R2, R3, and R4 are present on the paths from the sender to the destination, it is preferable to split the path into a path including three domains R0, R1, and R2 based on the sender and a path including three domains R2, R3, and R4 to the destination using the third domain R2 as a branch domain connecting the split paths with each other.

The requesting of the forwarding consent to the domains by the domain (S30) is a step of request the consent defining the approval of forwarding to the domains existing on the path on which the domains are split for transmission through the packet forwarding, in partial paths split in the splitting of the path (S20). It is preferable to request the consent to a domain preceding on each partial path among the domains, including the sender. Specifically referring to FIG. 4, according to the exemplary embodiment of the present invention, it is preferable that the sender R0 preferably requests the consent to the second and third domains R1 and R2 included in the first partial path and the third domain R2 preferably requests the consent to the fourth domain R3 and destination R4 included in a second partial path.

In the issuing of the consent by receiving the request for the consent by the authentication server 210 (S40), the authentication server 210 of the domains receiving the request for the approval issues the consent approving the forwarding and the issued consent is transmitted to the domains requesting the approval.

In the forwarding of the packet including the consent issued by the forwarding processing unit 220 (S50), the consent issued by the forwarding processing unit 220 is added to the headers of the packets and the packets generated by combining playloads and headers are forwarded to next domains on the determined path. The payloads means a storage space storing a real data portion in addition to information required for transmission such as the header information in the packets.

Figure 3:
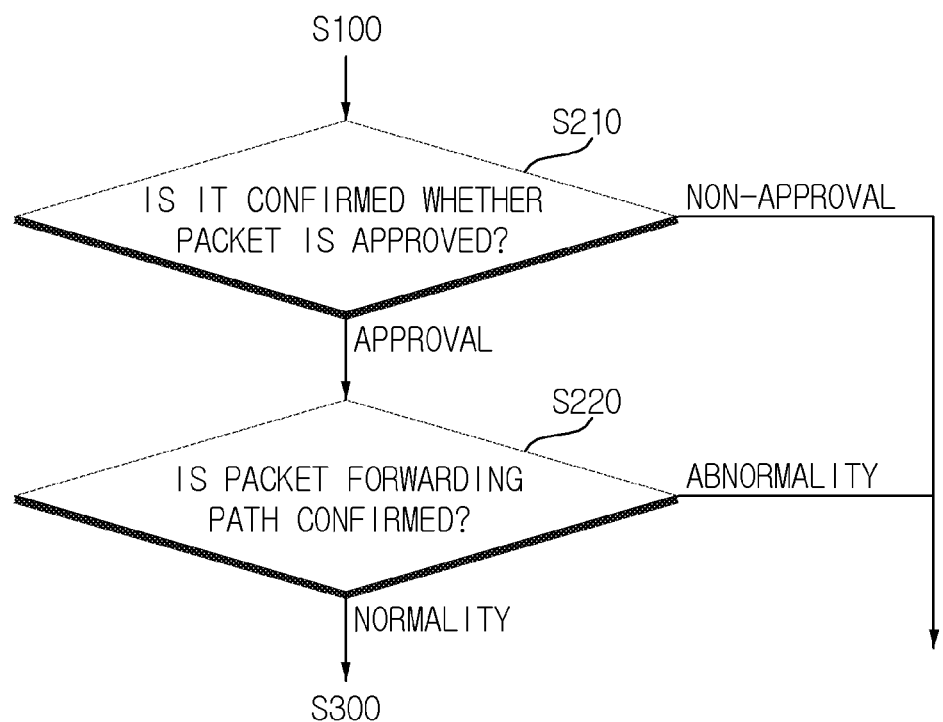
FIG. 3 is a flow chart showing in detail a method for confirming normal packets according to an exemplary embodiment of the present invention.

The confirming, by the normal packet confirming unit 221, whether the received packets are normal packets (S200) will be described in detail with reference to FIG. 3. FIG. 3 is a flow chart showing in detail a method for identifying normal packets according to an exemplary embodiment of the present invention.

Referring to FIG. 3, the confirming whether the received packets are normal packets by the normal packet confirming unit 221 (S200) includes confirming, by an approval confirming unit 221a, whether the forwarding is approved in the domains in which the packets are received (S210) and confirming, by a path confirming unit 221b, the forwarding path of the received packets (S220). In the confirming, by an approval confirming unit 221a, whether the forwarding is approved in the domains in which the packets are received (S210), it is confirmed whether the forwarding through the received domains is approved by using the path consent included in the headers of the forwarded data. According to the exemplary embodiment of the present invention, in the confirming, by an approval confirming unit 221a, whether the forwarding is approved in the domains in which the packets are received (S210), the approval confirming unit 221a determines that the packets are packets in which the forwarding is approved when the packets include the approval information issued from the domain R1 by allowing the domain R1 receiving the packets from the sender R0 to refer to the consent included in the headers of the received packets. If it is determined that there is no consent, the received packets are determined as abnormal packets. In this case, the normal packet confirming unit 221 stops the transmission and drops the packets (S700).

In the confirming of the forwarding path of the received packets by the path confirming unit 221b (S220), the path confirming unit 221b confirms whether the received packets are received via the paths set by the path server 100 by using the path tracing information included in the headers of the received packets.

According to the exemplary embodiment of the present invention, the path confirming unit 221b confirms whether the received packets go through all the paths to go through until being reached to the corresponding domains by referring to the path tracing information in the headers of the received packets. When the received packets go through all the paths to go through, the normal packet confirming unit 221 determines that the received packets are determined as normal data. When the received packets are received without going through any of the domains included in the paths to go through, the normal packet confirming unit 221 determines that the received packets are determined as abnormal packets and thus, stops the transmission and drops the packets (S700).

When the normal packet confirming unit 221 determines that the received packets are normal packets, in the confirming, by the path identification information searching unit 222, whether the path identification information is present in the received domains (S300), the path identification information searching unit 222 confirms whether a header information storage unit of the domain receiving the packets includes the path identification information corresponding to the transmission path of the received packets.

According to the exemplary embodiment of the present invention, the branch domain branching each of the split paths in the paths split in the path server 100 preferably includes information on all the paths so as to forward the received packets to a next path. When the path identification information corresponding to the path identification information included in the headers of the received packets is included in the header information storage unit of the received domains, it is preferably determined that the domains are the branch domain in the transmission path of the packets.

The header information storage unit 223 stores and manages a swapping header and the path identification information. The swapping header, which is a header swapped in the swapping of the headers of the received packets by the header swapping processing unit 224 (S400) to be described below, preferably, includes the path consent, the path identification information defining the paths determined by the path server 100, and the path tracing information for tracing the forwarding path.

According to the exemplary embodiment of the present invention, the path identification information is preferably a path connection key determined by the path server 100. In FIG. 4, it is preferable that the path identification information is a sharing key for five domains R0, R1, R2, R3, R4, and R5.

The path identification information is also stored in the swapping header and is separately stored or managed in the header information storage unit, which compares the stored path identification information with the path identification information of the received packets and determines whether to include the same path identification information.

When the path identification information is present, the header swapping processing unit 224 swaps the headers of the received packets to the swapping headers included in the header information storage unit when the domains receiving the packets are the branch domain branching the split paths in the swapping of the headers of the received packets by the header swapping processing unit 224 (S400). The header swapping processing unit 224 swaps the headers for the domains included in the partial path split in the branch domain by swapping the headers to the swapping headers and therefore, needs to embed the header corresponding to the number of domains going through from the sender to the designation. As a result, as the number of domains to go through is increased, the lengths of the headers are long in response thereto, such that the time processed on the data plane and the overhead of the memory occupied by all the packets are reduced. The length of the path tracing information that corrects the forwarding information in response to the number of domains going through from the sender to the designation is increased and therefore, the overhead may be reduced by swapping the path tracing information.

In correcting the path tracing information of the packets received by the path tracing information correcting unit 225 (S500), the path tracing information correcting unit 225 records in the path tracing information that the received packets are a normally forwarded packet in the domains receiving the packets. It is preferable that the path tracing information includes the tracing information on the partial paths split by the path server 100. According to the exemplary embodiment of the present invention, when the received packets are normal packets, it is preferable to correct the path tracing information independent of path identification information searching results confirmed in the confirming, by the path identification information searching unit 222, whether the path identification information is present in the received domains (S300). In the swapping of the headers of the received packets by the header swapping processing unit 224 (S400), when the headers of the received packets are swapped to the swapping headers, correcting the path tracing information is preferably performed by correcting the path tracing information of the swapped headers. When the swapping of the headers is not performed, it is preferable to correct the path tracing information existing in the headers of the received packets.

In the forwarding of the packets by the forwarding unit 226 (S600), the forwarding unit 226 forwards the packets in which the path tracing information is corrected to next domains. According to the exemplary embodiment of the present invention, in the forwarding of the packets by the forwarding unit 226 (S600), the packets are forwarded until the received packets reach the destination R4.

FIG. 4 is an exemplified diagram showing a system for domain based packet forwarding according to an exemplary embodiment of the present invention. Referring to FIG. 4, the system for domain based packet forwarding according to the exemplary embodiment of the present invention includes the path server 100 that receives the request for path information and splits the paths and a domain 200 that forwards the packets.

The path server 100 receives the request for path information for transmission from the sender wanting to transmit the packets to the destination in the domain 200 (S10) and determines the paths. The path server 100 splits the paths into the number of domains according to a predetermined reference (S20) and transmits the path information to the domains branching the paths split in the split paths. Specifically referring to FIG. 4 as described above, the path server according to the exemplary embodiment of the present invention preferably splits the domains into three domains R0, R1, R2, R3, and R4 based on the sender as a reference, when five domains R0, R1, R2, R3, and R4 are present on the paths from the sender to the destination and splits the path into a path including three domains R2, R3, and R4 to the destination using the third domain R2 as a branch domain connecting the split paths with each other.

The domain 200 will be described in more detail with reference to FIGS. 5 and 6.

Figure 5:
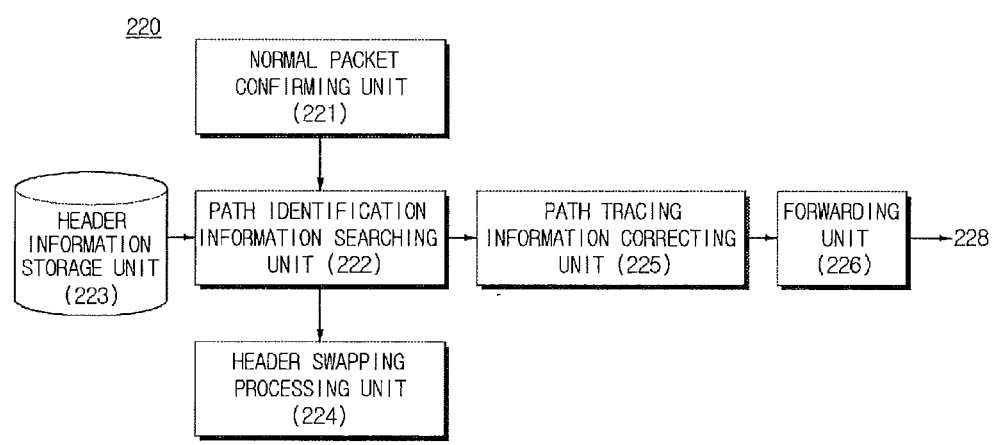
FIG. 5 is a block diagram showing an internal structure of a domain according to an exemplary embodiment of the present invention.
Figure 6:
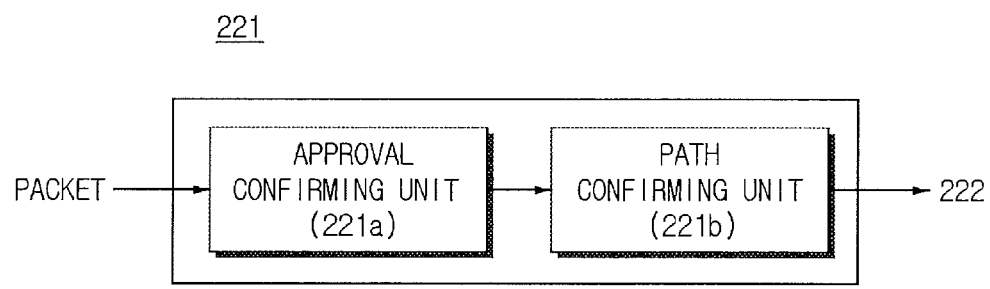
FIG. 6 is a detailed block diagram of a normal packet confirming unit according to an exemplary embodiment of the present invention.

FIG. 5 is a block diagram showing an internal structure of a domain according to an exemplary embodiment of the present invention. In the method for domain based packet forwarding according to the exemplary embodiment of the present invention, the domain 200 preferably is any one of the sender R0 transmitting the packets to the destination, the branch domain R2 connecting each of the servers split by the path server 100, the destination R4 that is the final destination of packets, and the intermediate domains R1 and R3 forwarding the packets on the path in addition to the foregoing domains.

The domain 200 includes the authentication server 210 that receives a request for the path approval from other domains and issues the consent and the forwarding processing unit 220 that forwards the packets.

In the requesting of the forwarding consent to the domains as described above, the authentication server 210 receives the request for the forwarding approval and issues the consent (S40) and transmits the approved consent to the domains requesting the approval.

The forwarding processing unit 220 will be described in detail with reference to FIG. 5. The forwarding processing unit 220 includes: the normal packet confirming unit 221 confirming whether the received packets are normal packets, the path identification information searching unit 222 searching whether the path identification information (warning sharing key value) corresponding to the transmission path of the received packets is present in the header information storage unit of the received packet; the header information storage unit 223 storing or managing the path identification information and the swapping header; the header swapping processing 224 that swaps the headers of the packets to the swapping header when the path identification information is searched, the path tracing information correcting unit 225 that corrects the path tracing information of the received packets, and the forwarding unit 226 that forwards the received packets to next domains.

The normal packet confirming unit 221 will be described in detail with reference to FIG. 6. FIG. 6 is a detailed block diagram of a normal packet identifying unit according to an exemplary embodiment of the present invention. The normal packet confirming unit 221 according to the exemplary embodiment of the present invention includes the approval confirming unit 221a and the path confirming unit 221b that confirm the forwarding approval.

As described above, the approval confirming unit 221a determines whether the consent issued from the authentication server 210 of the domains receiving the packets is present in the headers of the received packets (S210). When the consent is present in the headers of the received packets, the received packets are determined as the approved packets and when the content is not present, the received packets are determined as the abnormal packets and thus, are dropped (S700).

As described above, the path confirming unit 221b confirms whether the received packets are the packets received going through all the domains included in the paths determined by the path server 100 by using the path tracing information of the received packets (S220). When there are the received packets that do not go through the domains, the received packets are determined as the abnormal packets and are dropped (S700).

The path identification information searching unit 222 confirms whether the header information storage unit of the domain receiving the packets includes the path identification information corresponding to the transmission path of the received packets (S300).

According to the exemplary embodiment of the present invention, the branch domain R2 includes the path identification information (path sharing key values of R0, R1, R2, R3, and R4) of the packets received in the header information storage unit 223.

The header information storage unit 223 stores and manages the swapping headers and the path identification information.

The header swapping processing unit 224 swaps the headers of the received packets to the swapping headers included in the header information storage unit (S400) when the path identification information corresponding to the transmission path of the packets received by the path identification information searching unit 222 is searched by the header information storage unit 223. According to the exemplary embodiment of the present invention, it is preferable to swap the headers of the received packets in the branch domain R2 to the swapping headers.

As described above, the path tracing information correcting unit 225 records in the path tracing information that the received packets are normally forwarded in the domains receiving the packets (S500).

According to the exemplary embodiment of the present invention, in the branch domain R2, the path tracing information correcting unit 225 preferably corrects the path tracing information after the headers are swapped (S400) and in the intermediate domains R1 and R3, records that the packets are forwarded via the intermediate domains without swapping the headers (S500).

The forwarding unit 226 forwards the received packets to the next domain on the path (S600). As described above, according to the exemplary embodiment of the present invention, the packets of which the headers are corrected are forwarded through the forwarding processing unit 220 of the intermediate domains R1 and R3 and the branch domain R2 until the packets forwarded from the sender R0 reach the destination (S600).

Figure 7:
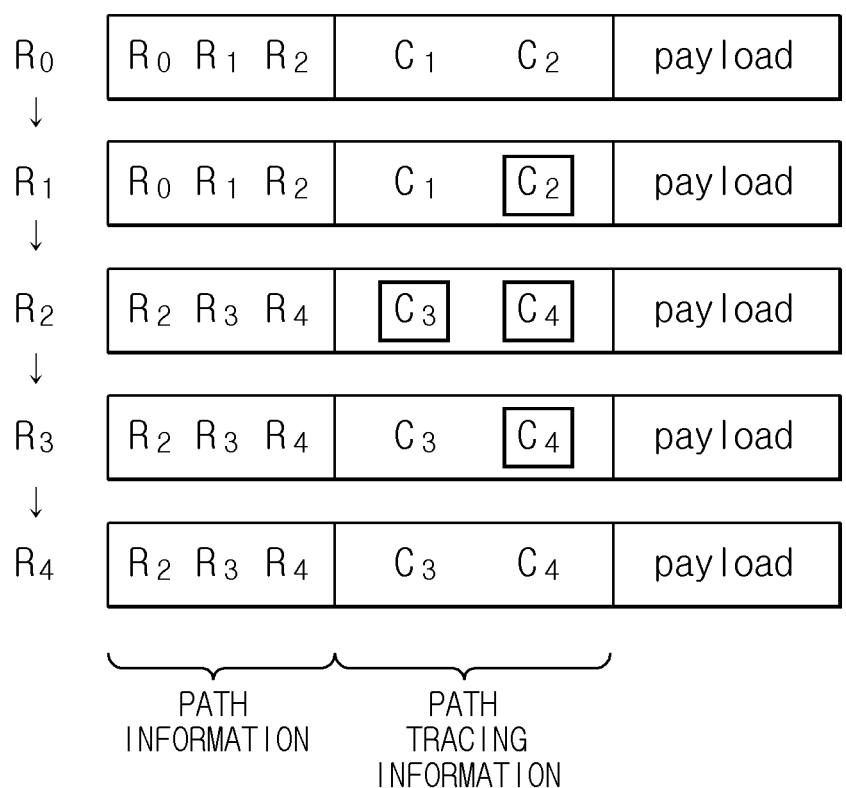
FIG. 7 is a schematic diagram showing an internal structure of a packet forwarded according to an exemplary embodiment of the present invention.

The internal structure of the data packets forwarded according to the exemplary embodiment of the present invention will be described with reference to FIG. 7. FIG. 7 is a schematic diagram showing an internal structure of a packet forwarded according to an exemplary embodiment of the present invention. The packets may include the path information, the path tracing information, and the payloads. The path information may include the path information defining the forwarding path of the packets split by the path server and the path tracing information may include the tracing information for tracing the path through which the packets are forwarded. The intermediate domain R1 of the first partial path performs the packet authentication and the confirmation of the paths to go through by using the header generated in the sender R0. The intermediate domain R1 corrects a header C2 for tracing the paths. The branch domain R2 connecting the first partial path with the second partial path performs the packet authentication and the confirmation of the paths to go through and then, searches a swapping table to swap the headers to the previously generated swapping headers. The branch domain R2 corrects headers C3 and C4 for tracing the paths. The packet authentication and the confirmation of the paths to go through are performed in the intermediate domain R3 of the second partial path. The intermediate domain R3 corrects a header C4 for tracing the paths. The packet authentication and the confirmation of the path to go through is performed in the destination R4. The transmission of the packets is completed.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for domain based packet forwarding, wherein the method is performed by a domain based packet forwarding system, comprising:
    determining whether identification information corresponding to path identification information of a packet for identifying paths to which packets to be forwarded is in a header information storage unit storing identification information corresponding to transmission paths of packets;
    swapping headers of the packets including the forwarding path information of the packets defining the forwarding paths of the packets with swapping headers of the header information storage unit by using the identification information, if it is determined that the identification information is present in the header information storage unit; and
    correcting a path tracing information related to a forwarding path history of the packets included in the headers of the packets.

2. The method of claim 1, further comprising:
    prior to the determining whether the identification information is present,
    receiving the packets forwarded through a predetermined path; and
    confirming whether the received packets are normal packets,
    wherein the determining whether the identification information is present is performed when the received packets are normal packets.

3. The method of claim 2, wherein the confirming whether the received packets are normal packets includes:
    determining whether the headers of the received packets have consent issued from the domains receiving the packets; and
    determining whether the received packets are forwarded through the predetermined paths by using the path tracing information of the received packets.

4. The method of claim 2, further comprising:
    if it is determined that the received packets are abnormal packets in the confirming whether the received packets are the normal packets, dropping the received packets.

5. The method of claim 1, further comprising:
    prior to the receiving of the packets,
    receiving a path information request signal for transmitting packets from a sender and splitting the packets according to the number of predetermined domains;
    receiving, by preceding domains that are at the head on each of the split partial paths, path consent from succeeding domains on the partial paths; and
    forwarding, by the sender, packets in which the headers including the consent and payloads are combined to the succeeding domains on the paths.

6. The method of claim 5, wherein the headers generated by the sender further includes the path identification information defining the predetermined paths and the path tracing information for tracing the forwarding paths.

7. The method of claim 1, further comprising:
    forwarding packets to succeeding domains succeeding to domains receiving packets in which the path tracing information is corrected on the predetermined paths.

8. The method of claim 7, wherein it is repeatedly performed until the packets are forwarded to the destination of the predetermined paths.

9. The method of claim 1, wherein the header information storage unit includes the swapping headers into which the headers of the received packets are swapped and the path identification information.

10. The method of claim 9, wherein the swapping headers include the path consent, the path identification information defining the predetermined path, and the path tracing information related to a forwarding path history of the packets.

11. A system for domain based packet forwarding through domains, comprising:
    a path server configured to receive a path information request signal for transmitting packets from a sender and split the paths according to the number of predetermined domains; and
    a forwarding processing unit configured to process forwarding of packets using the split paths,
    wherein the forwarding processing unit includes:
    a normal packet confirming unit configured to receive the packets forwarded through a predetermined path and confirm whether the received packets are normal packets,
    a header information storage unit configured to store or manage header information for forwarding the received packets,
    a path identification information searching unit configured to determine whether path identification information corresponding to paths of the received packets is present in the header information storage unit if it is determined that the received packets are normal packets,
    a swapping processing unit configured to swap the headers of the packets with swapping headers of the header information storage unit, if it is determined that the path identification information is present in the header information storage unit, and
    a path tracing information correcting unit configured to correct the path tracing information included in the headers of the packets.

12. The system of claim 11, further comprising:
    an authentication server configured to receive a request for the packet forwarding through the domains and issue consent approving the receiving.

13. The system of claim 11, wherein the normal packet confirming unit includes:
    an approval confirming unit configured to confirm whether the headers of the received packets have the consent issued from the domains receiving the packets; and
    a path confirming unit configured to determine whether the received packets are forwarded through the predetermined paths by using the path tracing information of the received packets.

14. The system of claim 11, wherein the domains drop the received packets when the received packets are abnormal packets in the normal packet confirming unit.

15. The system of claim 11, wherein the forwarding processing unit of the domains further includes a forwarding unit configured to forward the packets in which the path tracing information is corrected to succeeding domains on the predetermined paths.

16. The system of claim 11, wherein the header information storage unit includes the swapping headers into which the headers of the received packets are swapped and the path identification information defining the predetermined paths.

17. The system of claim 16, wherein the swapping header includes the path consent, the path identification information, and the path tracing information for tracing the paths.

* * * * *